(12) United States Patent
Bulan et al.

(10) Patent No.: US 8,100,330 B2
(45) Date of Patent: Jan. 24, 2012

(54) METHOD FOR ENCODING AND DECODING DATA IN A COLOR BARCODE PATTERN

(75) Inventors: Orhan Bulan, Rochester, NY (US); Vishal Monga, Webster, NY (US); Gaurav Sharma, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 412 days.

(21) Appl. No.: 12/436,456

(22) Filed: May 6, 2009

(65) Prior Publication Data

US 2010/0282851 A1 Nov. 11, 2010

(51) Int. Cl.
G06K 7/10 (2006.01)
G06K 19/08 (2006.01)
G06K 9/18 (2006.01)
(52) U.S. Cl. .......... 235/462.04; 235/462.01; 235/462.09
(58) Field of Classification Search . 235/462.01–462.49
See application file for complete search history.

(56) References Cited

U.S. PATENT DOCUMENTS

| | | | |
|---|---|---|---|
| 4,149,183 A | 4/1979 | Pellar et al. | |
| 4,149,194 A | 4/1979 | Holladay | |
| 4,196,151 A | 4/1980 | Suyama et al. | |
| 4,196,451 A | 4/1980 | Pellar | |
| 4,656,345 A | 4/1987 | Kurimoto | |
| 5,045,952 A | 9/1991 | Eschbach | |
| 5,083,816 A | 1/1992 | Folga et al. | |
| 5,091,966 A | 2/1992 | Bloomberg et al. | |
| 5,221,833 A | 6/1993 | Hecht | |
| 5,226,094 A | 7/1993 | Eschbach | |
| 5,245,165 A | 9/1993 | Zhang | |
| 5,291,243 A | 3/1994 | Heckman et al. | |
| 5,315,098 A | 5/1994 | Tow | |
| 5,369,261 A | 11/1994 | Shamir | |
| 5,608,821 A | 3/1997 | Metcalfe et al. | |
| 5,673,121 A | 9/1997 | Wang | |
| 5,684,885 A | 11/1997 | Cass et al. | |
| 5,689,587 A | 11/1997 | Bender et al. | |
| 6,252,971 B1 | 6/2001 | Wang | |

(Continued)

OTHER PUBLICATIONS

Divsalar, et al., "Coding Theorems for 'Turbo-Like' Codes," Proc. 36th Annual Allerton Conference on Communications, Controls, and Computing, pp. 201-210, (Monticello, IL, USA), Sep. 1998.

(Continued)

*Primary Examiner* — Michael G Lee
*Assistant Examiner* — Laura Gudorf
(74) *Attorney, Agent, or Firm* — Philip E. Blair; Fleit Gibbons Gutman Bongini & Bianco P.L.

(57) ABSTRACT

What is disclosed is a system and method for encoding and decoding data in a color barcode pattern using dot orientation and color separability. The spectral (wavelength) characteristics of the CMY colorants, commonly used in digital printing, and those of RGB sensors are exploited to achieve high capacity data embedding rates in color barcodes. The present method embeds independent data in two different printer colorant channels using dot orientation modulation. In the print end, dots of two colorants occupy the same spatial region. At the detector end, by using the complementary sensor channels to estimate the colorant channels, data is recovered in each colorant channel. The method approximately doubles the capacity of encoding methods based upon a single colorant channel and enables embedding rates which match or exceed that of other hardcopy barcodes known in the arts. The method is robust against inter-separation misregistration with a small symbol error rate.

18 Claims, 8 Drawing Sheets

U.S. PATENT DOCUMENTS

| | | |
|---|---|---|
| 6,694,041 B1 | 2/2004 | Brunk |
| 2003/0116630 A1* | 6/2003 | Carey et al. ............. 235/462.09 |
| 2005/0068588 A1 | 3/2005 | Lieberman |
| 2008/0019559 A1 | 1/2008 | Wang et al. |

OTHER PUBLICATIONS

Jin, et al., "Irregular Repeat-Accumulate Codes," Proc. 2nd International Symposium on Turbo Codes and Related Topics, pp. 1-8, (Brest, France), Sep. 2000; (8 pages).

Hecht, David L., "Printed Embedded Data Graphical User Interfaces," IEEE Computer, pp. 47-55, IEEE 0018-9162, Mar. 2001.

Solanki, et al., "Modeling the Print-Scan Process for Resilient Data Hiding," Security, Steganography, and Watermarking of Multimedia Contents VII, Proc. of SPIE-IS&T Electronic Imaging, vol. 5681, pp. 418-429, Mar. 2005.

Damera-Venkata, et al., "Hardcopy Image Barcodes Via Block-Error Diffusion," IEEE Transactions on Image Processing, vol. 14, No. 12, pp. 1977-1989, Dec. 2005.

Oztan, et al., "Continuous Phase Modulated Halftones and Their Application to Halftone Data Embedding," Proc. of the IEEE International Conference on Acoustics, Speech, and Signal Proc. (ICASSP), vol. II, pp. 333-336, (Toulouse, France), May 2006.

Oztan, et al., "Self-Modulated Halftones," Proc. of the IEEE International Conference on Image Processing (ICIP), pp. 1533-1536, (Atlanta, GA, USA), Oct. 2006.

Solanki, et al., "'Print and Scan' Resilient Data Hiding in Images," IEEE Transactions on Information Forensics and Security, vol. 1, No. 4, pp. pp. 464-478, Dec. 2006.

Bulan, et al., "Adaptive Decoding for Halftone Orientation-Based Data Hiding," submitted to IEEE International Conference on Image Processing, (San Diego, CA, USA) for presentation Oct. 2008; (4 pages).

Bulan, et al., "Data Embedding in Hardocpy Images Via Halftone-Dot Orientation Modulation," Department of Electrical and Computer Engineering, University of Rochester, Rochester, NY, 2008; (1 page).

Bulan, et al., "Data Embedding in Hardocpy Images Via Halftone-Dot Orientation Modulation," Security, Forensics, Steganography, and Watermarking of Multimedia Contents X, Proc. SPIE-IS&T Electronic Imaging, vol. 6819, pp. 1-11, Jan. 2008.

Bulan, et al., "On the Capacity of Orientation Modulation Halftone Channels," presented at IEEE International Conference on Acoustics, Speech, and Signal Processing, (Las Vegas, NV, USA) Mar. 30-Apr. 4, 2008.

Wong, et al., "Data Hiding and Watermarking in JPEG Compressed Domain by DC Coefficient Modification," Proc. of SPIE Sym. of Security and Watermarking of Multimedia Contents 2000, vol. 3971, pp. 237-244, (San Jose, CA, USA) Jan. 2000.

Pei, et al., "Novel Robust Watermarking Technique in Dithering Halftone Images,", IEEE Signal Proc. Letters, vol. 12, No. 4, pp. 333-336, Apr. 2005.

Moon, Todd K., "The Expectation Maximization Algorithm," IEEE Signal Processing Magazine, vol. 13, pp. 47-60, Nov. 1996.

Baharav, et al., "Watermarking of Dither Halftoned Images," HP Technical Report HPL-98-32, HP Labs Israel, pp. 307-316, May 1999.

Bulan, et al., "High Capacity Color Barcodes Using Dot Orientation and Color Separability," 7 pages.

"High Capacity Color Barcode Technology—Microsoft Research," pp. 1-2, Downloaded May 5, 2009 at http://research.microsoft.com/en-us/projects/hccb/about.aspx.

* cited by examiner

METHOD FOR ENCODING AND DECODING DATA IN A COLOR BARCODE PATTERN

CROSS REFERENCE TO RELATED APPLICATIONS

This patent application is related to co-pending U.S. patent application Ser. No. 12/436,432, entitled: *"Method For Encoding And Decoding Data In A Color Barcode Pattern"*, filed concurrently herewith.

TECHNICAL FIELD

The present invention is directed to systems and methods for encoding a data message in a color barcode pattern and for decoding data embedded in a hardcopy color barcode image pattern.

BACKGROUND

Embedding information in printed documents-continues to be a problem of considerable interest. A plethora of legal and official documents such as IDs, passports and other transactional data are consumed in the printed format. Hence, systems and algorithms for protecting and interacting with hardcopy content are a necessity. Hardcopy information embedding methods can be categorized as data hiding or data encoding approaches. Methods in the former category are essentially (hardcopy) image watermarking schemes and hence must adhere to stringent requirements of maintaining faithfulness to the content of the image to be printed. In the literature, many hardcopy data hiding methods have been proposed. As is well known of watermarking, these methods aim to achieve the best possible trade-off between the often conflicting goals of high embedding rate vs. perceptible distortion to the host image.

Data encoding methods, however, offer greater latitude in embedding distortion and instead focus primarily towards maximizing number of embedded bits per unit area of the printed document. Driver license images, credit cards and other similar documents that are constrained in the amount of physical area to embed in are excellent candidates that can benefit from such methods. Amongst existing prior art and literature, the primary representatives of data encoding methods are one and two dimensional barcodes. The universal product code (UPC) is a well-known example of one dimensional (1-D) barcodes that is widely used for tracking trade items. Though being convenient for price tags and item tracing, UPC cannot be utilized for high capacity applications, e.g. conveying additional information to enhance the quality of the electronically captured images of documents or verify authenticity.

Two dimensional (2-D) barcodes bring a viable solution to printed media security by storing additional information. In personal ID's, driving licenses and passports, this additional information can be a sample voice, a picture or personal information (i.e. data of birth, name of the card holder) which in turn may be used to establish authenticity of the printed document. Although 2-D barcodes have relatively high information storage capacity, they are primarily based upon monochromatic or single ink printing. The extension to color is highly desirable for the benefits it carries in terms of embedding rate per unit area. There are two known color barcode schemes: one recently developed at Microsoft and the other being DataGlyphs. The former method encodes the data as triangles in one of four colors (black, red, green and yellow) where the color is chosen based upon the data. While this allows for each triangle to carry a 4-ary value, as we see subsequently, the flexibility afforded by the spectral difference between the colorants is not fully exploited. DataGlyphs, on the other hand, in their color instantiation operate by simply using the same glyph pattern in a dot-on-dot mode that fundamentally offers the same capacity as a single channel.

Given that barcodes are widely utilized for embedding data in hardcopy format to provide automated identification and tracking capabilities in a number of applications, it is desirable to maximize the number of bits embedded per unit area in order to either reduce the area requirements of the barcodes or to offer an increased payload, which in turn enlarges the class of applications for these barcodes.

Accordingly, what is needed in this art are increasingly sophisticated systems and methods for encoding and decoding data in a color barcode pattern.

BRIEF SUMMARY

What is provided are a novel system, method, and computer program product for embedding data in a colored barcode pattern. The present method effectively exploits the spectral (wavelength) characteristics of Cyan, Magenta and Yellow (CMY) widely used in digital printing, and the Red, Green and Blue (RGB) sensors of the spectrally selective color channels of widely used color image capture devices. Briefly, in the encoding end, for each colorant channel, the spatial extent of the area dedicated to the barcode is partitioned using a periodic tiling pattern. Each single unit of data to be embedded in the color barcode pattern is associated with a unique tile for one of the colorants. Each unique state that the single unit of data can assume is associated with a unique orientation direction. For each colorant layer, dots are printed in a given cell in the orientation which is associated with the state of the single data value to be embedded in that cell. Multiple colorant layers are super-imposed on each other in the spatial extent of the barcode area. At the decoding end, following local and global synchronizations to address geometric distortions which might have been introduced by the printing and image-capture processes, for each colorant detected in the hardcopy barcode, an orientation of each dot of this colorant in each tile is estimated using statistically motivated image moments. The single data value embedded in the cell is then decoded based upon the unique state associated with this particular color and dot orientation direction. The collection of a plurality of image moments from a plurality of tiles can be collectively utilized to decode an embedded data message comprising a plurality of single data units that were previously encoded for enabling error correction.

One embodiment of the present method for encoding a message in a hardcopy color barcode pattern involves the following. A data message to be embedded is initially received. The message consists of a plurality of single data values, each having only one unique state from a set of possible values defined for the barcode. Colorants having substantially non-overlapping absorption spectra are selected for this colored barcode. The selection of colorants can be based upon the spectral sensitivity of the color channels of the image capture device intended to be used to capture an image of the hardcopy color barcode pattern. For each of the selected colorants, the following steps are performed. A 2-dimensional image pattern of a layer of this colorant is divided into a periodic tiling. A set of orientation directions that a dot of this colorant can have is defined with respect to a horizontal and vertical axis of the image pattern, such as, for example, any of a 0°, +/−45°, and 90° orientations. Each of the orientation directions is associated with a different unique state that a single data value can have. Then, for each tile in this colorant pattern, the following are performed. A determination is made whether a single data value is to be embedded in this tile. If so, then a substantially elliptical dot of this colorant is printed with a major axis of the dot's ellipse having an orientation direction corresponding to the unique state of the single data value embedded in that tile. The process repeats for all tiles of each colorant layer until the complete data message has been embedded in the barcode. The multiple colorant layers are super-imposed on each other in the spatial extent of the barcode area.

One embodiment of the method for decoding a color barcode pattern involves the following. An image of a hardcopy color barcode pattern containing a data message embedded therein is captured using a image capture device having a plurality of spectrally selective color channels, such as a scanner, or a digital camera. The embedded message consists of a plurality of single data values with each having only one unique state from a set of possible unique states defined for this particular barcode. For each colorant in the hardcopy color barcode pattern, the following are performed. A 2-dimensional image of a pattern representative of the colorant is produced from the scan data received from the spectrally sensitive color channels. The image undergoes a global and a local synchronization. The image is globally synchronized such that image is oriented with respect to a same horizontal and vertical axis as was used to print a layer of this same colorant in the barcode. The image is locally synchronized by partitioning into tiles that substantially conform to a same tiling as was used to encode data in this same colorant in the barcode, but are not necessarily uniform in size due to the distortions introduced in the printing and capture processes. Following global and local synchronization, each orientation direction that a dot of this colorant can take is associated with a different unique state of a single data value. For each tile containing a dot of this colorant, the orientation of the dot is determined, for instance, for elliptical dots this can be the direction of a major axis of the ellipse. The determination of the orientation can be performed by using image moments calculated along each of the orientation directions that a dot of this colorant can possibly have. The largest of the image moments determines a dot's orientation direction. The single data value is decoded based upon the unique state that is associated with a dot of the colorant in consideration having the given orientation direction. The process repeats for all tiles for each colorant until the data message embedded in the barcode has been decoded. The method may also be combined with error control coding. In this case, prior to embedding the data message to be embedded is encoded and the collection of a plurality of image moments computed for a corresponding plurality of tiles is then used to decode the data message.

Advantageously, data can be embedded in a barcode pattern at a relatively high capacity and can be successfully recovered with an overall error rate that is relatively small. By associating each colorant used in rendering the color barcode with a set of orientation directions for any given dot in each cell thereof, the present method effectively increases the overall data capacity of color barcodes. Moreover, the present method is robust against inter-separation misregistration since data is embedded and detected in each separation independently based upon the orientations of individual printed dots of colorants and not in the color resulting from the overlap between the separations. The present data method can be performed offline for each clustered dot design to be supported by a particular printer. The data encoded in the barcode pattern can only be decoded through an understanding of the associations of unique states and the dot color and dot orientation combinations used to encode the data therein. Furthermore, if required, the data can be secured using standard cryptographic functionality.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

Figure 1:
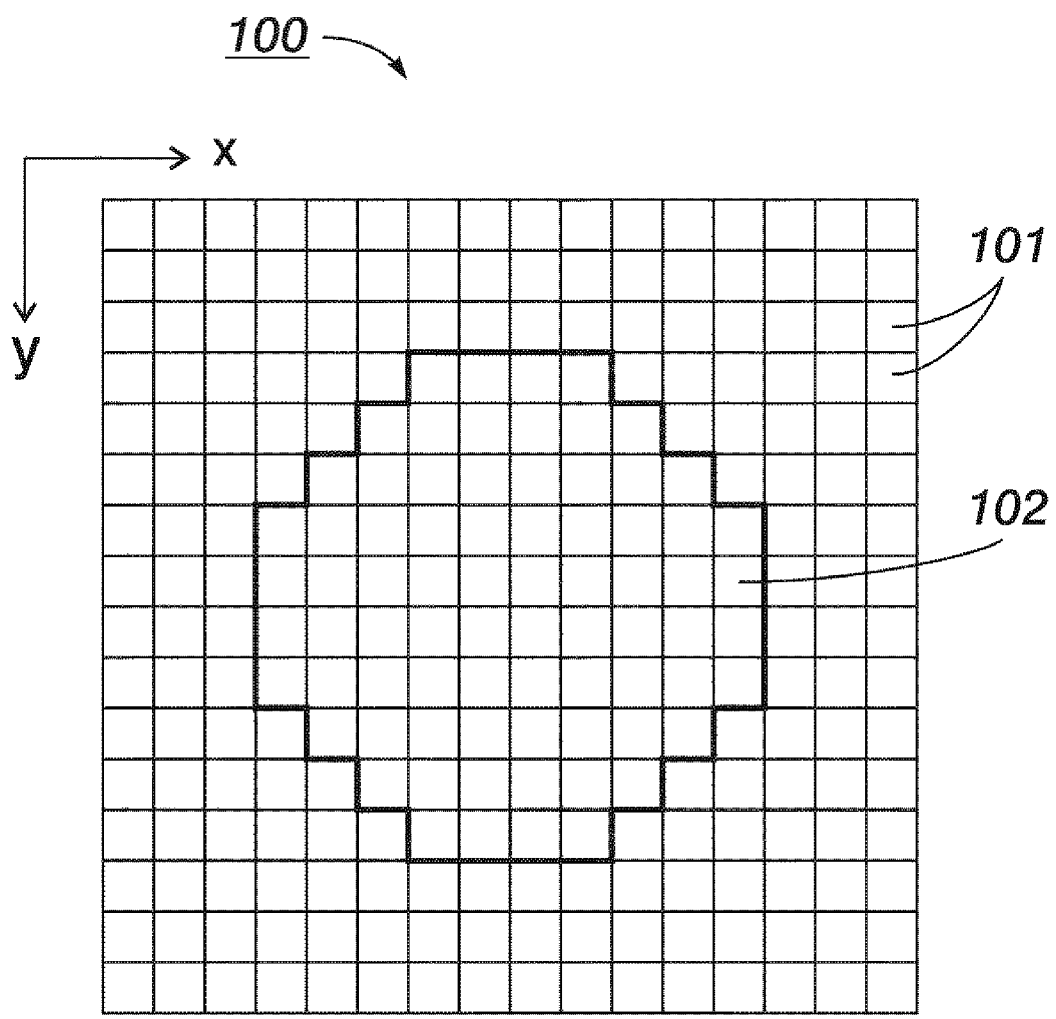
FIG. 1 illustrates one example single cell or "periodic tile" whereon a dot has been printed, each cell encompasses a plurality of pixel locations as defined by the periodic tiling.

What is disclosed are a system and method for embedding data in a colored barcode pattern and a system and method for recovering embedded data from a hardcopy color barcode pattern.

It should be understood that one of ordinary skill in this art should clearly understand many facets of print processes, 2-D periodic tiling, and other related techniques common in the color science arts. Additionally, one should also be readily familiar with mathematical techniques involving the computation of image moments, conditional densities, probabilistic modeling, and the like, as discussed herein. One of ordinary skill would also be knowledgeable about computer science and hardware and software systems and algorithms sufficient to implement the functionality and capabilities described herein in their own document reproduction environments without undue experimentation.

A pixel, as used herein, refers to the smallest segment into which a printed image is divided and may also refer to a signal associated with a particular position in an image. Each pixel can be a bit in binary form, a gray scale value, or a set of coordinates in the color space of the image. Pixel values can be converted into CIELAB color space by a RBG to Lab converter to obtain luminance (L) and chrominance (a,b) values. Chrominance (a) is the chrominance of a first channel. Chrominance (b) is the chrominance of a second channel. Luminance (L) is a photometric quantity which, in essence, is the effect of radiance on our eyes. Radiance is the physical quantity related to light intensity, i.e., the power of the light spreading out in some solid angle over an area. Luminance is the integration of radiance weighted with a curve, which describes how efficiently different wavelengths of light trigger visual receptors in the eye. Primary colors are understood to be: Cyan (C), Magenta (M), Yellow (Y), and Black (K). Secondary colors are understood to be: Red=(M+Y), Blue=(C+M), and Green=(C+Y).

A "unique state" refers to one state from a set of possible state values. For example, in a 2-state binary system (two orientation directions), the set of values is: {0, 1}. This set contains a total of $2^1=2$ possible unique states a single data value can take. In a 4-state binary system (4 orientation directions), the set of values is: {00, 01, 10, 11}. This set contains a total of $2^2=4$ possible unique states a single data value can take. Another set contains the values: {000, 001, 010, 011, 100, 101, 110, 111}. This set contains a total of $2^3=8$ unique states, and so on. Note, while sets of binary values are shown for ease of illustration, the unique states can in general be derived from any arbitrary set whose cardinality does not necessarily have to be a power of 2.

A "data message" (or original message) refers to any information (text, numeric, symbolic, etc.) which can be reduced to a binarized stream of 1's and 0's representative of a collection of unique states as defined herein. An original message is composed of a plurality of single data values. Each of the single data values is associated with one of the possible unique states taken from one of the sets of binary values, as defined above, used for encoding. An original data message having a data format other than binary may be converted to a binary bit stream prior to embedding. Any of a plurality of techniques well known in the arts can effectuate data conversions. The unique state of each single data value retrieved from each periodic tile during decoding collectively forms the original message. Single data values are encoded in the image by orienting colorant dots in a unique orientation direction. As will be discussed in further detail herein, each of the unique states from a given set of binary values used for encoding is associated with a unique orientation direction. If a 2-state system is used for encoding then a single data value can assume one unique state (0 or 1) from the defined set of binary values. In this case, two unique orientations are necessary to embed all possible single data values for a given colorant. For example, in a layer of cyan colorant, the unique state of 0 might be associated with an orientation direction along a major x-axis (horizontal 0°) and the unique state of 1 would be associated with an orientation direction orthogonal to the x-axis along the major y-axis (vertical 90°). The same orientations may also be used for Magenta and Yellow colorants. In a 4-state system {00, 01, 10, 11}, a total of 4 unique orientation directions would be needed to embed all possible single data values for a given colorant. In this instance, in a layer of magenta colorant, for example, the unique state of 00 might be associated with an orientation along the major x-axis; the unique state of 01 might be associated with the major y-axis; the unique state 10 might be associated with the +45° diagonal direction; and the unique state 11 associated the −45° diagonal direction.

In should be understood that, in the present method, each of the unique states from the set of possible unique state values is mapped, in a one-to-one correspondence, to a particular orientation direction that a dot of a particular colorant can take. A colored dot would thus only be printed having one of the possible orientation directions defined for that particular colorant. The orientation direction for a dot of a given colorant is associated with one unique state of a single data value. As such, there exists a one-to-one correspondence between all possible unique states a single data value can take and all possible colorant/orientation-direction combinations.

A barcode refers to a machine readable pattern as is known in the arts. Barcode patterns are read by optical scanners called barcode readers or recovered from an image by specialized software. Data in barcode patterns is typically represented in widths and spacings of lines arrayed as linear 1-D symbologies. Such symbologies also assume geometric patterns such as, for example, squares, triangles, and hexagons.

A "color marking device" refers to a color output device capable of rendering text, graphics, images, plots, graphs, and the like, for visual examination. Such devices include production printers, xerographic devices, image reproduction equipment, color monitors, displays, and any device capable of outputting a color signal. To render a color image is to output the image to a color output device. Color output devices receive a color signal of the image and reduce the signal to viewable form. Image reduction includes the process of marking a substrate with colorants to form the image from the visual integration of the colorants on the substrate, or to display the image on an image display device. Devices capable of dot-on-dot printing include products, such as ink-jet devices, which operate by propelling variably-sized droplets of liquid or molten material (inks, pigments, etc.) mixed with a colorant onto a media substrate, such as paper. The output image is formed from the visual integration of the colored dots. Appropriate sizing operations have to be performed for images where the input resolution in terms of scanned pixels is different from the output resolution in terms of printed pixels. Color devices exhibit considerable diversity in their color spaces. While the spectrum of an object is physically a continuous stimulus, devices typically use a lower-dimensional (3-D/4-D) representation of color. Printing systems are mostly based upon Cyan, Magenta, and Yellow colorants. Displays and image capture devices such as scanners and digital cameras, use a color model based upon red, green, and blue (RGB) sensors to represent color images. Based upon the utilization of RGB or CMY color spaces, color devices can be categorized as additive or subtractive. Additive color devices, such as cameras and scanners, represent color through the combination of additive Red, Green, and Blue colors. The additive mixing of primary colors Red, Green, and Blue, produces the desired result. The combination of all three (RGB) colors produces White. The absence of all three results in Black. Subtractive systems use CMY space and form color by subtracting unwanted spectral components from the white light. In particular, Cyan absorbs the spectral region corresponding to Red. Magenta absorbs the region corresponding to Green. Yellow eliminates Blue. The subtractive mixing of the colors Cyan, Magenta, and Yellow, produces a desired color. The overlay of all three (CMY) colors produces black. The CMY colorants absorb most of the light energy in non-overlapping wavelength bands and therefore interfere only to a limited extent with bands corresponding to other colorants.

Hence, when an image or pattern produced by using Cyan, Magenta, and Yellow colorants is captured with a device with three channels that are selectively sensitive in the Red, Green and Blue regions of the spectrum, the Red channel can convey information about the Cyan colorant. The Green channel can convey information about Magenta, and the Blue channel about Yellow. This allows for a separation of the patterns or images printed in the individual colorants at the scanner. For situations where a reduced capacity is required, two complementary channels can be used to separate the two colorants.

Since the absorption bands of individual colorants interfere with each other and thus can cause unwanted absorptions in the spectra of the color print, colors having substantially (or approximately) non-overlapping absorption spectra are used herein. Therefore, when only two colorants are utilized, Cyan and Yellow colorants are preferably selected to embed data since their absorption bands in the spectra are the most distant from each other. FIG. 10 illustrates idealized CMY and RGB color cubes in their respective color spaces. FIG. 11 illustrates two plots. Plot (a) illustrates the spectral emissions of RGB light. Plot (b) denotes the spectral transmittance of CMY colorants where each colorant absorbs in one region of the spectrum. It should be appreciated that, based upon their spectral characteristics, colorants in CMY space are complementary to their respective RGB colors. The Cyan colorant absorbs primarily in the red region of the visible spectrum (roughly 600-700 nm in wavelength), the Magenta colorant absorbs primarily in the green region of the visible spectrum (roughly 500-600 nm in wavelength), and Yellow colorant absorbs primarily in the blue region of the visible spectrum (roughly 400-500 nm).

The set of "image input devices" include scanners, cameras, photography equipment, copiers, facsimile devices, photo reproduction equipment, and the like. To render an image is to output the image to an image output device. Image output devices receive the image signal and reduce the signal to a viewable form. Example image output devices capable of image reduction include printers, copiers, monitors, projectors, and the like. Image reduction includes marking a substrate with one or more colorants to form an image from the visual integration of the colorants on the substrate, or display the image on a display device.

At the onset hereof, it is important to provide a brief explanatory illustration to provide a basis for an understanding of the teachings hereof.

Reference is now being made to FIG. 1 which illustrates one cell 100 whereon a dot 102 has been printed. Each cell encompasses a plurality a pixels. Each pixel 101 has its own respective location within a cell. Cell size for a given periodic tiling is constant. It should be clear that a cell may encompass more or fewer pixels than are being shown for explanatory purposes. The cell of FIG. 1 is intended to be illustrative. Printed dot 102 is also illustrative. In practice, a dot of a given colorant is printed at a resolution such that the illustrative jagged lines are not visible to the naked eye and furthermore these are smoothed out in the printing process.

Cell 100 represents a very small region of a larger region on a barcode pattern. The collection of printed colored dots forms the viewable barcode pattern. The resolution of the pattern is typically defined by the number of pixels of the color marking device used to print the barcode. The fine resolution in which pixels are printed visually integrates neighboring pixels. Not all pixel locations of all cells have colorant deposited thereon. Information about what has been printed at each pixel location can be retrieved from a scan of the barcode using a barcode scanning device or an image capture device known in the arts. The image sensors of the image capture device provide digitized information about intensity and color at each pixel in the captured image. The image is preferably captured using a device with sufficient resolution such that the orientations of the dots may be resolved.

Figure 2A:
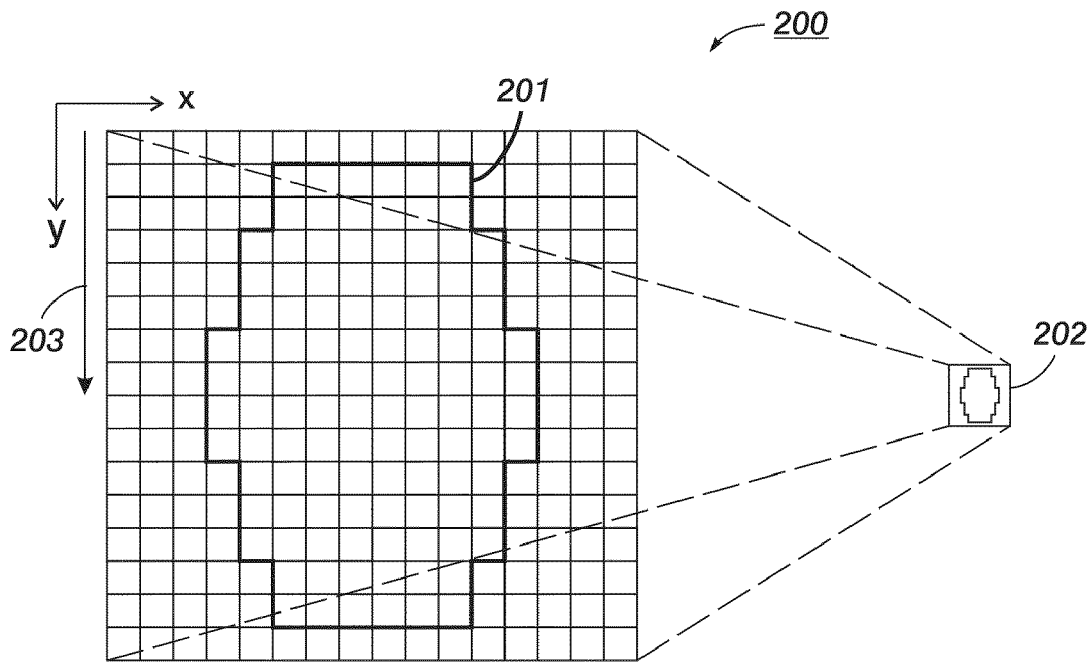
FIGS. 2A-B illustrate example orientation directions in accordance with the teachings hereof.
Figure 2B:
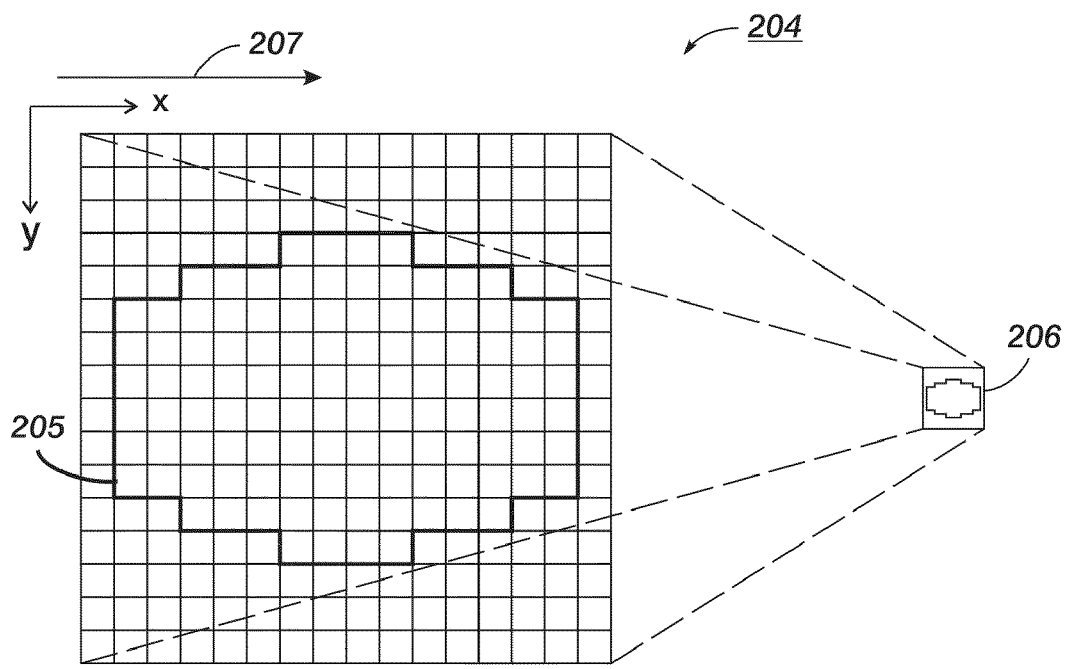

Reference is now made to FIGS. 2A-B which illustrate example orientation directions in accordance with the teachings hereof. The dot of FIG. 1 is shown reprinted in cell 200 of FIG. 2A. Dot 201 is the much smaller dot 202 shown substantially enlarged to illustrate the approximately elliptical dot having been oriented in a direction substantially along y-axis 203. Cell 204 of FIG. 2B is dot 205 shown substantially enlarged from dot 206 to illustrate the elliptical dot oriented in a direction substantially along x-axis 207. The elliptical dot can additionally be oriented substantially along a diagonal axis (+/−45°), not shown.

Figure 3:
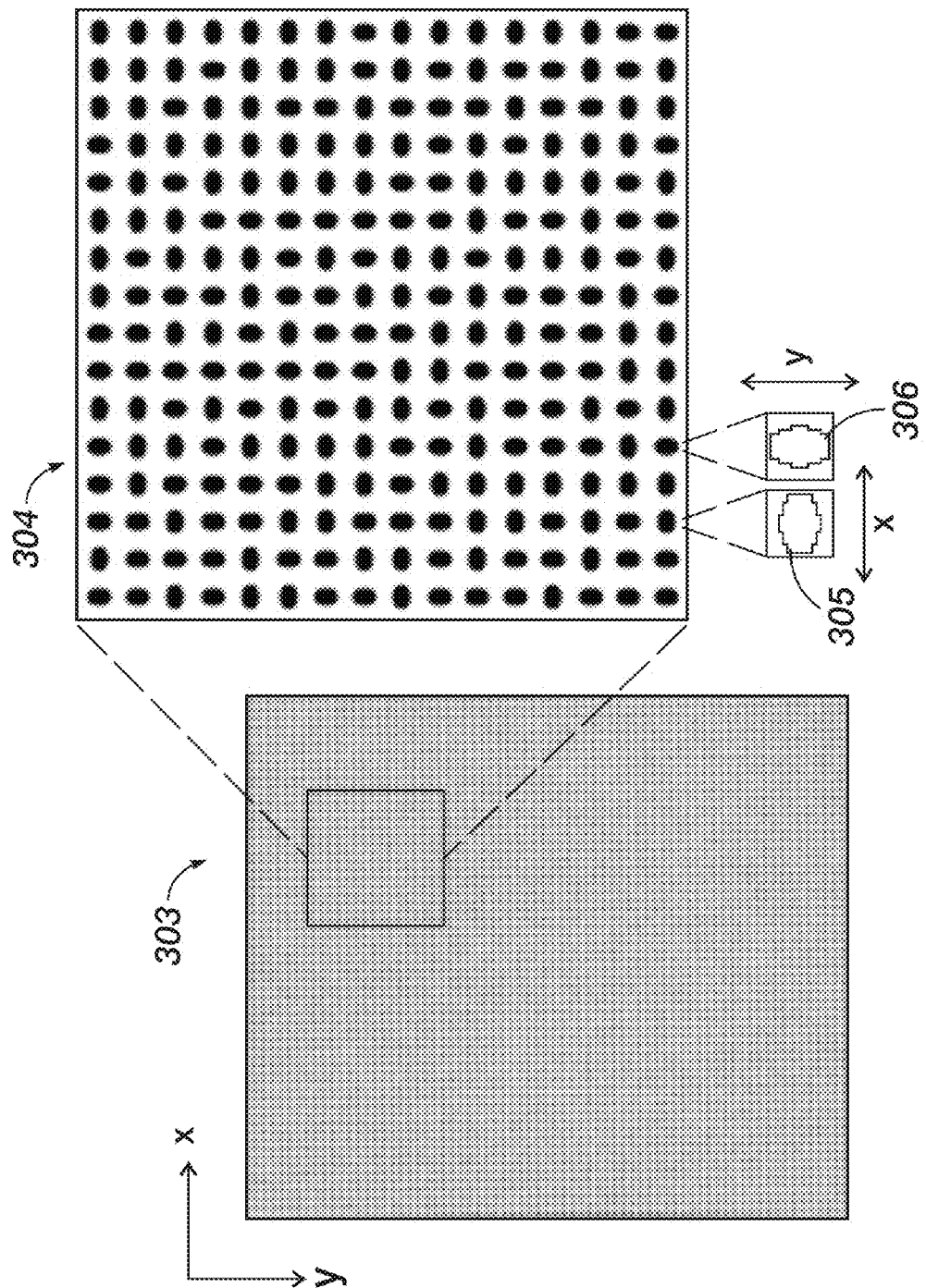
FIG. 3 illustrates an example image wherein message data has been encoded in accordance with the present method of data encoding using dot orientation modulation.

Reference is now made to FIG. 3 illustrating an example barcode pattern wherein a data message has been embedded in accordance with the present encoding method. It should be appreciated that, although the example barcode pattern 303 is shown in black/white, the barcode pattern is printed using different colorants which have been previously selected for this color barcode. Each dot printed in the selected colorant has a unique orientation direction. Each of the orientation directions is associated with a single data value being represented by that particular colored oriented dot. What is shown is one colorant layer of a subsection of the much larger colored barcode pattern.

Pattern subsection 304 represents a small section of the barcode 303 in one colorant having some elliptical dots with a major axis oriented in the x-direction (horizontal) and some elliptical dots with a major axis oriented in the y-direction (vertical) according to the present invention. This orientation represents the 0°/90° case. It should be understood that each colorant layer would have its own pattern of oriented dots printed in that colorant. Pattern subsection 304 illustrates the individual dots and their respective orientations which correspond to the unique state of the single data value encoded in each respective cell. Dot 305 of pattern subsection 304 has an elliptical dot oriented substantially along the x-axis (horizontal direction). Dot 306 has an elliptical shape with its "major-axis" oriented substantially along the y-axis (vertical direction). As previously discussed, the orientation of each of the colored dots for any given cell is determined by the single data value encoded in that cell. It is furthermore understood that elliptical is used for convenience of description and any dot shape that is preferably elongated along one direction with respect to other directions may be equivalently used.

Data Encoding Method

What is disclosed is a system and method for embedding data in a colored barcode pattern. The method exploits the spectral (wavelength) characteristics of Cyan, Magenta and Yellow widely used in digital printing. A set of orientation directions are associated with each colorant used to render the color barcode pattern. Each single unit of data to be embedded in the barcode pattern is associated with a unique dot orientation direction for each layer of colorant used to render of the barcode. For each layer of colorant, dots are printed in a given cell in the orientation which is associated with the single data value to be embedded in that cell.

Co-pending U.S. patent application Ser. No. 12/207,704, entitled "*Encoding Message Data in a Cover Contone Image Via Halftone Dot Orientation*", is incorporated herein in its entirety by reference.

Figure 4:
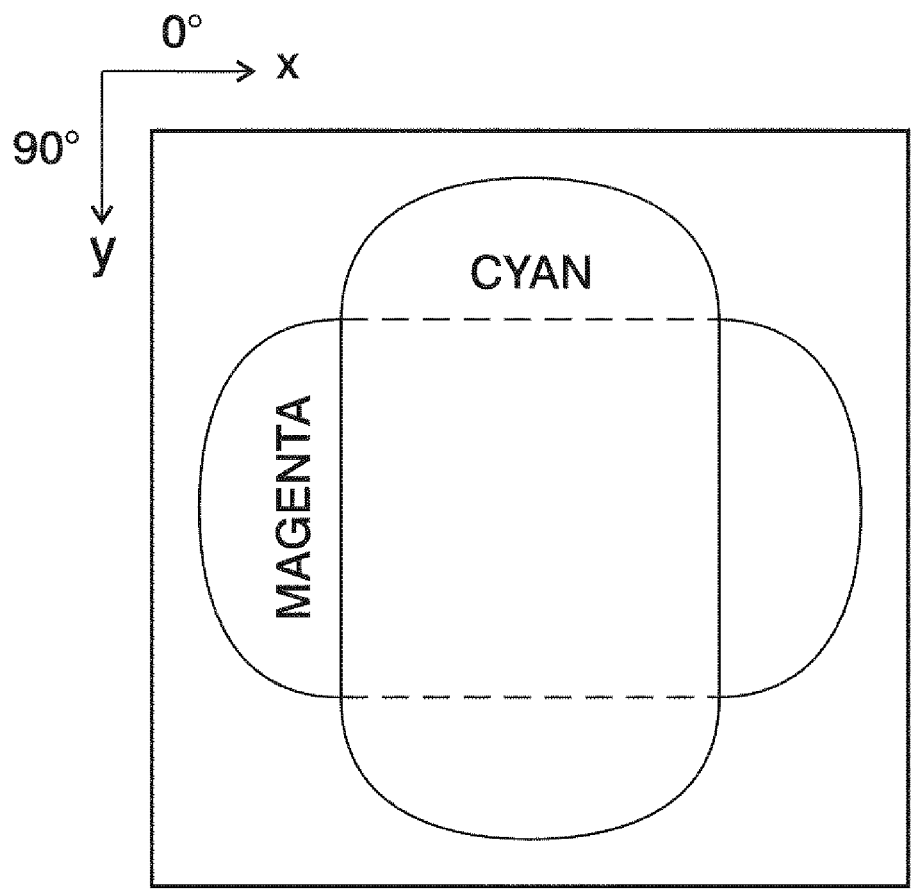
FIG. 4 illustrates a single cell wherein oriented dots of cyan and magenta colorants have been printed.

Reference is now being made to FIG. 4 which illustrates a single cell wherein oriented dots of cyan and magenta colorants have been printed. The substantially elliptical dot of cyan has a major axis of its ellipse oriented along the y-axis. The substantially elliptical dot of magenta has a major axis of its ellipse oriented along the x-axis. The area wherein the two dots overlap will have a blended color which is a combination of cyan and magenta. The spectrally sensitive color detection channels of the scanning device detect the colors of the printed dots. The detection takes advantage of the substantially non-overlapping absorption spectra of the colorants to detect the individual layers of the colorants despite the overlap. This illustration is intended to show that dots having same or different orientation directions can be rendered for each of the layers of the colorant. In this example, the dot representing the cyan+vertical orientation direction combination corresponds to the unique state of, for example, 0 from the two possible states of 0 and 1. The dot representing the magenta+horizontal orientation direction corresponds to the unique state of 1, for example, again from the two possible states 0 and 1. Decoding each of these printed dots from this particular cell means that the color and orientation direction for each dot is printed in a detectable manner. Upon detection thereof, the two single data values associated with the binary states of 0 and 1 would be decoded accordingly. Alternatively, a single tile having for instance a dot colorant/orientation combination of two different dots, such as the tile of FIG. 4, is decoded as having a combined binary value of the two unique states associated therewith. In this instance, the decoded value from this particular single tile would be one of four values 00, 01, 10, or 11 depending on a precedence order having been previously defined. Such an embodiment is intended to fall within the scope of the appended claims.

Figure 5:
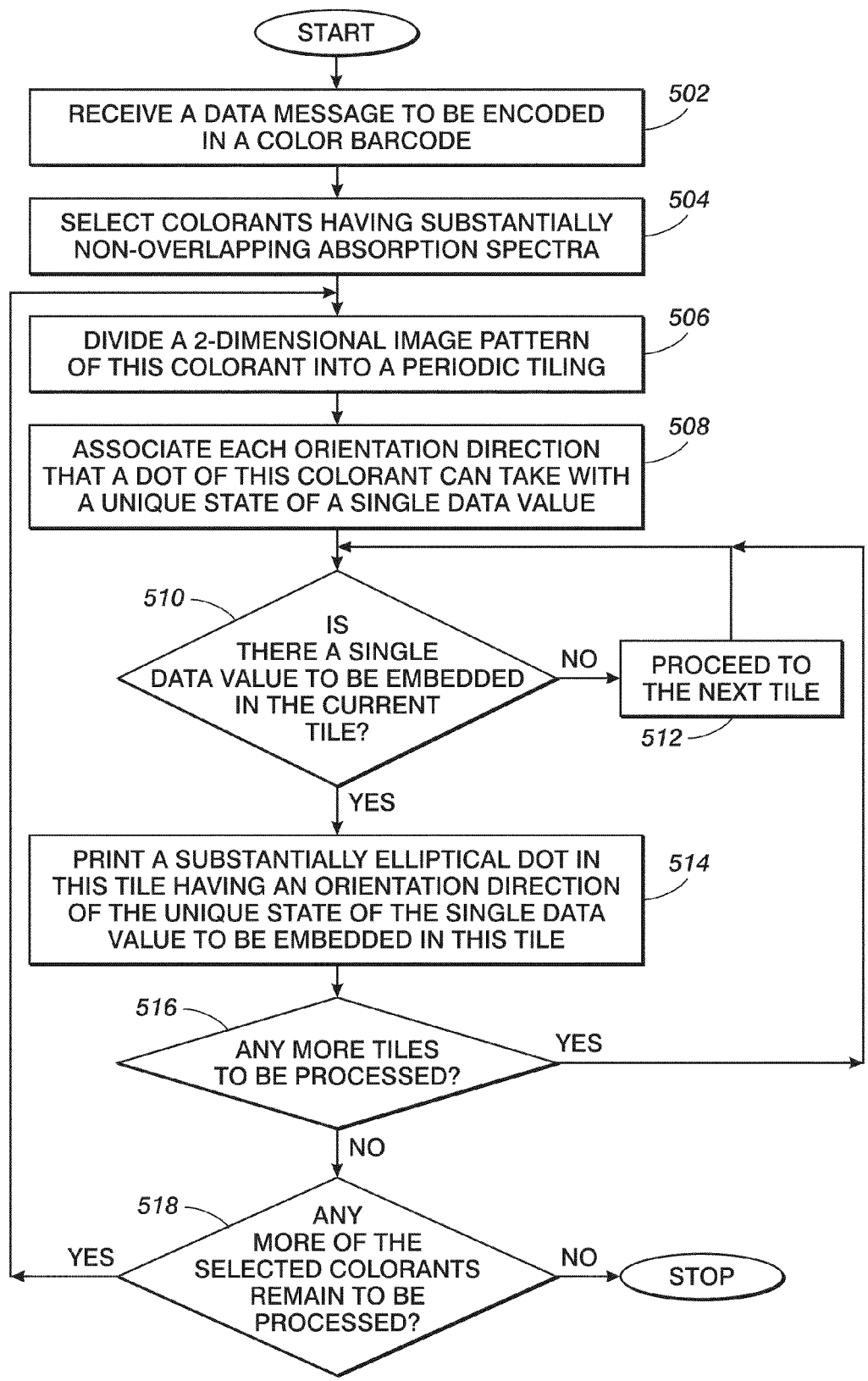
FIG. 5 illustrates a flow diagram of one example embodiment of the present method for encoding data in a color barcode pattern.

Reference is now made to FIG. 5 which illustrates a flow diagram of one example embodiment of the present method for encoding data in a color barcode pattern.

At 502, a data message to be encoded in a color barcode is received. The message is received by any of a variety of communication pathways or is alternatively provided by a user of a system wherein the present barcoding method is implemented. The message to be encoded consists of a plurality of single data values. Each of the single data values has only one unique state associated therewith. Each unique state is from a set of possible values defined for this barcode. Each of the colored dot orientation directions is associated with a unique states of a single data value.

At 504, colorants having substantially non-overlapping absorption spectra are selected for the barcode. The Cyan, Magenta, and Yellow colorants commonly used in color printing represent one example of colorants with non overlapping absorption spectra wherein the Cyan absorbs primarily in the red region of the visible spectrum (roughly 600-700 nm in wavelength), the Magenta absorbs primarily in the green region of the visible spectrum (roughly 500-600 nm in wavelength), and Yellow absorbs primarily in the blue region of the visible spectrum (roughly 400-500 nm). It should be appreciated that if the scanning device used to scan this barcode cannot discern the layers of colorant in the barcode then data embedded therein may not be completely decodable using the scanning device. For each of the selected colorants, the following steps are performed.

At 506, a 2-dimensional image pattern of this colorant is divided into a periodic tiling based upon a spatial extent of the image as defined by the periodic tiling used to render the image pattern. The uniform tiles are oriented with respect to a horizontal and vertical axis of the image pattern. Each of the uniform periodic tiles encompasses an array of pixel intensity values. Each tile is a single cell wherein a dot of this colorant will be printed.

At 508, associate each orientation direction that a dot of this colorant can take with a unique state that a single data value of the message can assume. In one example embodiment, the orientation directions are 0°, +/−45°, and 90°. The unique states are taken from the set of possible state values, as previously discussed. Then, for each tile, the following are performed.

At 510, a determination is made whether a single data value is to be embedded in this tile. If not then, at 512, processing proceeds to the next tile in the periodic tiling. If yes then, at 514, a substantially elliptical dot of this colorant is printed in this tile. A major axis of an ellipse of the dot is printed with an orientation direction which corresponds to the unique state of the single data value to be embedded in this tile. As a result, the single data value encoded in this particular tile is represented by the combination of the colorant of the printed dot and the orientation direction of the dot's ellipse.

At 516, a determination is made whether there are any more tiles remaining to be processed. If so, then processing repeats for all remaining tiles.

At 518, a determination is made whether any more of the selected colorants remain to be processed. If so, then processing repeats (with respect to step 506) for all remaining colorants until the data message has been fully encoded. If not, then processing stops.

Data may be encoded in one or more regions of each colorant layer of the color barcode such as, for instance, an upper corner or a central portion, or the like. Tiles in regions of colorant layers wherein portions of the data message have not been embedded would contain no dots or dots not having any orientation direction, i.e., substantially circular or some other geometric pattern which is not associated with any single data value. Alternatively, one or more colorants can be used to print substantially elliptical dots for which no unique state is associated. Such dots would be considered null bytes.

As previously discussed, data is embedded in the colored barcode as a function of dot orientation and dot color. Each of the unique states that a single data value can have is mapped to a respective colored dot with a particular orientation direction associated therewith.

Data Decoding Method

What is also disclosed is a method for decoding data from a hardcopy color barcode pattern containing a message embedded therein using the above-described encoding method. This method uses a color capture device with multiple channels with differing spectral sensitivities to capture an image of the hardcopy color barcode. The separability of the absorption bands of the colorants is then used to estimate images representative of the individual colorant layers. These images are then used for detecting the orientations of the corresponding dots.

Co-pending U.S. patent application Ser. No. 12/207,718, entitled "*Decoding Message Data Embedded In An Image Print Via Halftone Dot Orientation*", is incorporated herein in its entirety by reference.

Figure 6:
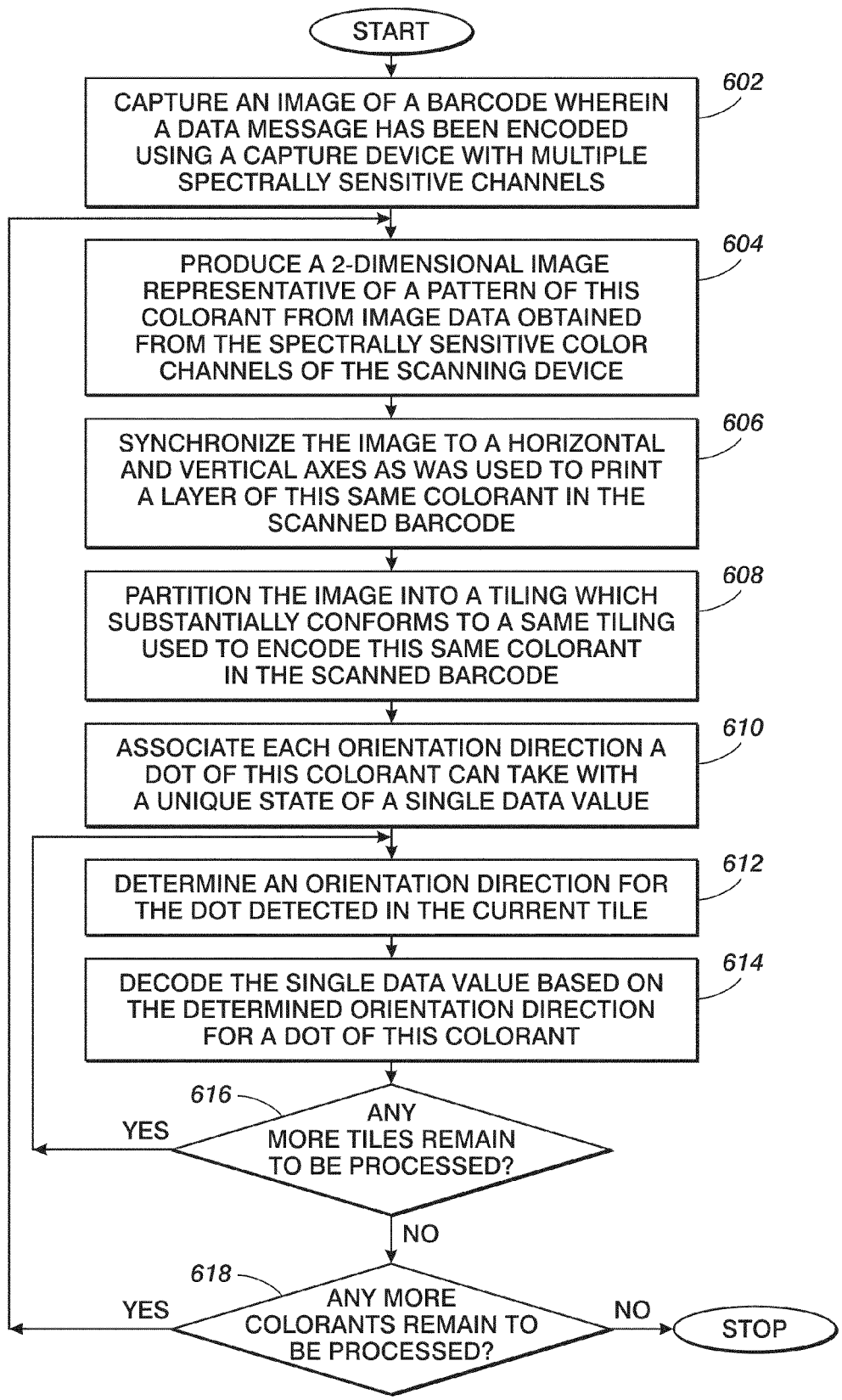
FIG. 6 illustrates one example embodiment of the present method for decoding data which has been embedded in a color barcode pattern.

Reference is now made to the flow diagram of FIG. 6 which illustrates one example embodiment of the present method for decoding data which has been embedded in a color barcode pattern.

In the example embodiment, at 602, a color barcode pattern containing an embedded data message is scanned using a color capture device having a plurality of spectrally selective color channels. The embedded data message consists of a plurality of single data values. Each of the single data values has one unique state taken from a set of possible state values, as was defined for this barcode.

For each colorant in the hardcopy color barcode, the following are performed. At 604, a 2-dimensional image of a pattern representative of this colorant is produced from the scan data received from the spectrally sensitive color channels of the scanning device used to scan the color barcode. One example color pattern is shown with respect to subsection 303 of FIG. 3. One such pattern of colorant is produced for each of the colorants used to render the color barcode.

Common color capture devices use red, green, and blue spectrally selective channels which are directly complementary to the Cyan, Magenta, and Yellow colorants commonly used for color printing. Thus for barcodes printed with Cyan, Magenta, and Yellow colorants, images captured with common color capture devices with red, green and blue channels can directly provide estimates of images representative of the individual colorants. Specifically, the image captured by the red channel is representative of the Cyan colorant printing, the image captured by the green channel is representative of the Magenta colorant printing, and the image captured by the blue channel is representative of the Yellow colorant printing. In scenarios where the colorants have considerable unwanted absorptions and/or the spectrally selective channels of the color capture device are non-complementary to the colorants used for printing, the images captured by the spectrally selective channels of the capture device may not directly correspond in a one to one fashion to the printing in each colorant and an additional estimation step may be required wherein the image from more than one channel of the capture device are used to estimate a colorant image representative of the printing in a given colorant. As a simple illustrative example, if the color capture device employs Cyan, Magenta and Yellow spectrally sensitive channels, estimates of the printing in Cyan would be obtained by subtracting the image recorded by the Cyan channel from the sum of the Magenta and Yellow channels. Those skilled in color science will appreciate that in general estimates of the individual print colorant layers would be obtained by combining the color images from the spectrally selective channels of the image capture device.

At 606, the image is globally synchronized such that the image is oriented with respect to a same horizontal and vertical axis as was used to print a layer of this same colorant in the scanned barcode. At 608, the image is locally synchronized such that the image is oriented with respect to a tiling which substantially conforms to the same tiling as was used to encode data in this same colorant in the scanned barcode. Following global and local synchronizations, at 610, each orientation direction that a dot of the colorant can take is associated with a different unique state of a single data value.

For each tile containing a colorant dot, the following are repeated. At 612, an orientation direction for the dot is determined. Such a determination is based upon a plurality of image moments calculated for the dot of the current tile. One image moment is calculated along each of the defined orientation directions a dot of this colorant can take. Image moments are computed about the center of mass for the dot. An orientation direction for the dot in the current tile is determined based upon the largest calculated image moment. All pixels in a particular cell contribute to moments along their respective orientation direction. The image moment is largest along the direction about in which the dot is elongated and thus indicates that the dot is oriented in that direction. The major axis of an elliptical dot corresponds with the direction with the largest image moment.

In another embodiment, where in order to increase robustness to errors and noise, prior to embedding, the data embedded in the color barcode has been encoded in accordance with an error control code, error correction decoding may beneficially be employed at the receiver. In this case for each tile wherein a single data value was embedded, a statistic of the scan data is determined for the corresponding tile in the image representative of dot orientation of the dot of the current colorant in that tile. The message embedded in the color barcode pattern is then decoded using statistics determined from a plurality of tiles. It should be appreciated that decoding of the embedded message may utilize only the computed statistics for the tiles for one colorant or may utilize the computed statistics for the tiles for multiple colorants. Those skilled in the art of error control coding will appreciate that for each colorant and each tile, the statistics utilized in this process may consist of the estimated image moments, the unique states associated with the estimated dot orientation, or other alternative statistics that represent not only the estimate of the dot orientation but also the degree of confidence in the estimated orientation.

At 614, the single data value embedded in this tile is decoded based upon the unique state associated with the orientation direction determined for the dot. At 616, a determination is made whether any more tiles remain to be processed. If so, then processing continues with respect to node B of FIG. 6, wherein an orientation direction is determined for a next dot detected in a next tile. If not, then all tiles have been processed. At 618, a determination is made whether all the colorants for the scanned color barcode pattern have been processed. If not then processing continues with respect to node C of FIG. 6, wherein a 2-dimensional image representative of a pattern of a next colorant is produced from scan data obtained from the spectrally sensitive color channels of the scanning device. Processing repeats for all tiles of all colorants until the data message embedded in the barcode pattern has been decoded.

Embodiments for calculating image moments $\sigma=[\sigma_1, \sigma_2, \ldots, \sigma_M]$ for unique orientation directions based upon a computed center of mass for a given dot will next be discussed.

Dot orientation estimation is based upon statistically motivated image moments computed within each cell. Specifically within a halftone cell C, M image moments are calculated as:

$$\sigma_i = \frac{\sum_{z,y \in C} I^s(x,y)(u_i - \bar{u}_i)^2}{\sum_{z,y \in C} I^s(x,y)} \text{ for all } i = 1, 2 \ldots, M$$

where $u_i = x \cos \theta_i + y \sin \theta_i$ represents the abscissa in a coordinate system that is rotated counterclockwise by an angle $\theta_i$ with respect to the image and where $$\bar{u}_i = \frac{\sum_{z,y \in C} I^s(x,y)u}{\sum_{z,y \in C} I^s(x,y)}$$

represents the corresponding coordinate for the center of the cell (in the rotated space).

Decoding, using the calculated image moments along each respective orientation direction, involves determining a larger of the calculated moments, $$i^* = \arg\max_{i=1,2,\ldots,M} \sigma_i.$$

The detection strategy is based on computing image moments along all candidate orientations and selecting the orientation corresponding to the dominant moment. The data is then extracted as the bit sequence corresponding to the detected orientation.

Error Correction Coding

For channel coding, various codes may be used. One of ordinary skill in this art would be familiar with code families such as Repeat Accumulate (RA) codes. See: "*Coding theo-*

*rems for 'turbo-like' codes*", D. Divsalar, H. Jin, R. J. McEliece, Proc. Allerton Conference, 201-210, Monticello, Ill., USA, (September 1998), which is incorporated herein in its entirety by reference. See also: "*Irregular Repeat-Accumulate Codes*", H. Jin, A. Khandekar, R. McEliece, Proc. 2nd Int'l. Conference on Turbo Codes, Brest, France, (September 2000), which is also incorporated herein in its entirety by reference. The choice of RA codes was motivated by the fact that these are near capacity-achieving and also readily allow the rate to be varied through a change of the repetition parameter. Approximate maximum a posteriori probability (MAP) decoding for RA codes is accomplished using belief propagation for iterative decoding. We describe the process below for the case with two orientations where a channel model has previously been developed for the moments $(\sigma_x, \sigma_y)$ along two orthogonal directions. By developing a probabilistic channel model for the more general M-orientation case and for multiple colorants, the method may be extended to those scenarios, albeit at the expense of increased complexity.

For two embedding orientations with RA codes, soft decoding can be performed by using the log likelihood ratio:

$$\gamma = \log \frac{p(\Theta_1, \hat{g})}{p(\Theta_2, \hat{g})}$$

where $p(\theta_{i}, \hat{g})$ is the likelihood given by:

$$p(\theta_i, \hat{g}) = f_{\sigma_x}(\sigma_x | \theta_i, \hat{g}) \cdot f_{\sigma_y}(\sigma_y | \theta_i, \hat{g})$$

where $\sigma_x, \sigma_y$ are the image moments along the x and y directions computed within the cell and $\hat{g}$ is the estimate of the local gray-level obtained as the average of the pixel intensity values within the cell. The gray level is determined by the fraction of the tile that is covered by the dot printed within the tile. For barcodes, once the gray level dependence is characterized, the actual barcodes may advantageously select a gray level for which the likelihood of confusion between different orientations may be minimized, thereby improving robustness.

For RA codes, the benefit of utilizing embedding schemes and decoding methods that are specifically designed for the print-scan channel in consideration—(operational) error-free embedding rates achieved are much greater than those reported by existing hardcopy data encoding methods.

In order to incorporate channel dependence on the local gray level of the cover image, a statistical model for the channel needs to be expressed in the form of a conditional density function, $f(\sigma_x, \sigma_y / \Theta_{i,g})$. The received image moments are conditioned on the local image gray level g and, horizontal and vertical orientations given by: $\Theta_{i,i}=1,2$.

A probabilistic model can be constructed which conditions received moments on input orientations by assuming conditional independence for the multi-dimensional density functions. In the binary embedding case under consideration here, one such a model is given by:

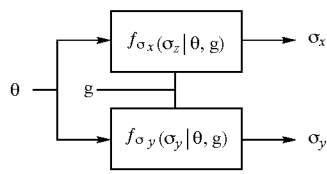

where the following conditional independence is assumed:

$$f_{\sigma_x, \sigma_y}(\sigma_x, \sigma_y | \theta_i) = f_{\sigma_x}(\sigma_x | \theta_i) \cdot f_{\sigma_y}(\sigma_y | \theta_i)$$

The above assumption can be validated by observing 2×2 covariance matrices of the received random vector σ conditioned on $\Theta_1, \Theta_2$, for several gray levels.

Empirical estimates of these covariance matrices obtained from scanned images corresponding to prints for different gray levels are provided. It should be appreciated that most of the matrices are close to diagonal thereby indicating that they may approximately be modeled as independent (because zero covariance across the off-diagonals guarantees "uncorrelatedness" and not independence). One example covariance matrix is as follows:

$$C_1 = \begin{bmatrix} 0.36 & 0.08 \\ 0.08 & 0.17 \end{bmatrix}$$

$$C_2 = \begin{bmatrix} 0.54 & 0.02 \\ 0.02 & 0.26 \end{bmatrix}$$

$$C_3 = \begin{bmatrix} 0.56 & 0.07 \\ 0.07 & 0.29 \end{bmatrix}$$

$$C_4 = \begin{bmatrix} 0.80 & 0.07 \\ 0.07 & 0.53 \end{bmatrix}$$

$$C_5 = \begin{bmatrix} 1.02 & -0.20 \\ -0.20 & 1.21 \end{bmatrix}$$

$$C_6 = \begin{bmatrix} 0.20 & 0.07 \\ 0.07 & 0.40 \end{bmatrix}$$

$$C_7 = \begin{bmatrix} 0.22 & 0.07 \\ 0.07 & 0.40 \end{bmatrix}$$

$$C_8 = \begin{bmatrix} 0.26 & 0.01 \\ 0.01 & 0.56 \end{bmatrix}$$

$$C_9 = \begin{bmatrix} 0.39 & 0.06 \\ 0.06 & 0.70 \end{bmatrix}$$

$$C_{10} = \begin{bmatrix} 0.50 & -0.09 \\ -0.09 & 0.82 \end{bmatrix}$$

Conditional densities can be characterized in terms of experimentally determined empirical histograms. The conditional densities were modeled by the exponential power density family parameterized by the scale parameter a and shape parameter b. One embodiment of an exponential power density is given by:

$$fx(x) = \frac{1}{2a\Gamma\left(1+\frac{1}{b}\right)} e^{\left(-\left|\frac{z}{a}\right|^b\right)}$$

For b=1, this reduces to a Laplacian distribution. For b=2, this takes a Gaussian form.

The parameters of the distribution are estimated using the Expectation-Maximization algorithm for exponential families as described in: "*The Expectation-Maximization Algorithm*", T. K. Moon, IEEE Signal Processing Magazine, Vol. 13, No. 6, 47-60, (1996), which is incorporated herein in its entirety by reference.

For each colorant, a decision on dot orientation can then be made using a maximum-likelihood criterion. One example criterion is given by:

$$\Theta^* = \operatorname*{argmax}_{i=1,2} f_{\sigma_z}(\sigma_x \mid \Theta_i), f_{\sigma_y}(\sigma_y \mid \Theta_i)$$

Performance of the present color barcoding method was evaluated using a xerographic printer and a flatbed scanner. Dot-on-dot halftoning was performing using 0°/90° orthogonal CY periodic tiles with a frequency of 120 cells per inch (cpi) to generate the barcode. For evaluation, data embedding was performed by using a halftone threshold function in order to modulate dot orientations along the x and y axis. The function is given by:

$$T(x,y) = \operatorname{sgn}(\cos(2\pi f_x x)\cos(2\pi f_y y))|\cos(2\pi f_x x)|^{p_x}|\cos(2\pi f_y y)|^{p_y}$$

where $f_x$ and $f_y$ are parameters that control the dot shape in the x and y directions. Programmable parameters, $\gamma_x$ and $\gamma_y$, are used for dot orientation. Setting one of these parameters to a larger value gives rise to elliptically shaped dots oriented along one of the vertical or horizontal directions. For instance, if $\gamma_x$ is greater than $\gamma_y$, the dot is oriented along a vertical axis. If $\gamma_y$ is greater $\gamma_x$ than then the dot is oriented along a horizontal axis. In the case where $\gamma_y$ equals $\gamma_x$, the dot is symmetric about the x and y axis. The function sgn( ), which extracts the sign of a real number, is given by:

$$\operatorname{sgn}(t) \begin{cases} 1 & \text{if } t \geq 0 \\ 0 & \text{if } t = 0 \\ -1 & \text{if } t < 0 \end{cases}$$

Dots are generated by thresholding a spatially uniform image I(x,y) against the threshold function based upon the following relationship:

$$I^b(x,y) = \begin{cases} 1 & \text{if } I(x,y) \geq T(x,y), \\ 0 & \text{if } I(x,y) < T(x,y), \end{cases}$$

Using the above relationship, if the intensity value at a given x,y pixel location within a tile is greater than or equal to the corresponding threshold value of the associated threshold array then a binary output value of 1 is produced (pixel is turned ON) for that pixel location. If the pixel intensity value is less than the corresponding threshold value then the binary output value is 0 (pixel is turned OFF) for that pixel. The collection of comparison results for a given tile produces a binary mask of 1's and 0's for that tile. Printing the dot according to the cell's binary mask produces a dot with the orientation direction associated with the unique state of the single data value encoded in that cell. Orientation parameters were set such that: $\gamma_x=1$ and $\gamma_y=3$, in order to achieve a horizontally oriented dot. The parameters are swapped to orient the dot in a vertical direction. The resulting digital barcode was printed on a color printer with an addressability of 2400 dpi. The resulting print was then scanned on a flatbed scanner. The colors were separated from the scanned image. Following color separation, moments were extracted from each individual color channel and orientation is estimated based upon the extracted moments. Performance was evaluated for both binary and 4-ary orientation modulation with scan resolution values of 1200 dpi and 2400 dpi. While data can be embedded at a capacity of 28,800 bits per square inch using binary modulation with symbol error rate (SER) less than $5 \times 10^{-3}$, 4-ary modulation allows to embed 57,600 bits per square inch with SER less than $6 \times 10^{-2}$.

SER performance of the present color barcode method is provided below.

| Modulation | Scanner Res. (dpi) | SER | Bits/inch sq. |
|---|---|---|---|
| Binary | 1200 | 0.0201 | 28,800 |
| Binary | 2400 | 0.0047 | 28,800 |
| 4 - ary | 1200 | 0.1316 | 57,600 |
| 4 - ary | 2400 | 0.0559 | 57,600 |

Here, only the SER performance of the present method are reported but the error free operational rates can also be obtained by utilizing error correction coding previously demonstrated with respect to techniques for data hiding in monochrome images. See "*Adaptive Decoding for Halftone Orientation-based Data Hiding*," O. Bulan, G. Sharma, and V. Monga, In Proc. IEEE Intl. Conf. Image Proc., 12-15 Oct. 2008, San Diego, Calif., pp. 1280-1283, which is incorporated herein in its entirety by reference. Comparing with other color barcodes that can embed 16,000 bits per square inch, the present method achieves higher embedding rates. The present method is largely robust against inter-separation misregistration since we embed and detect in each separation independently.

Various Embodiments

Figure 7:
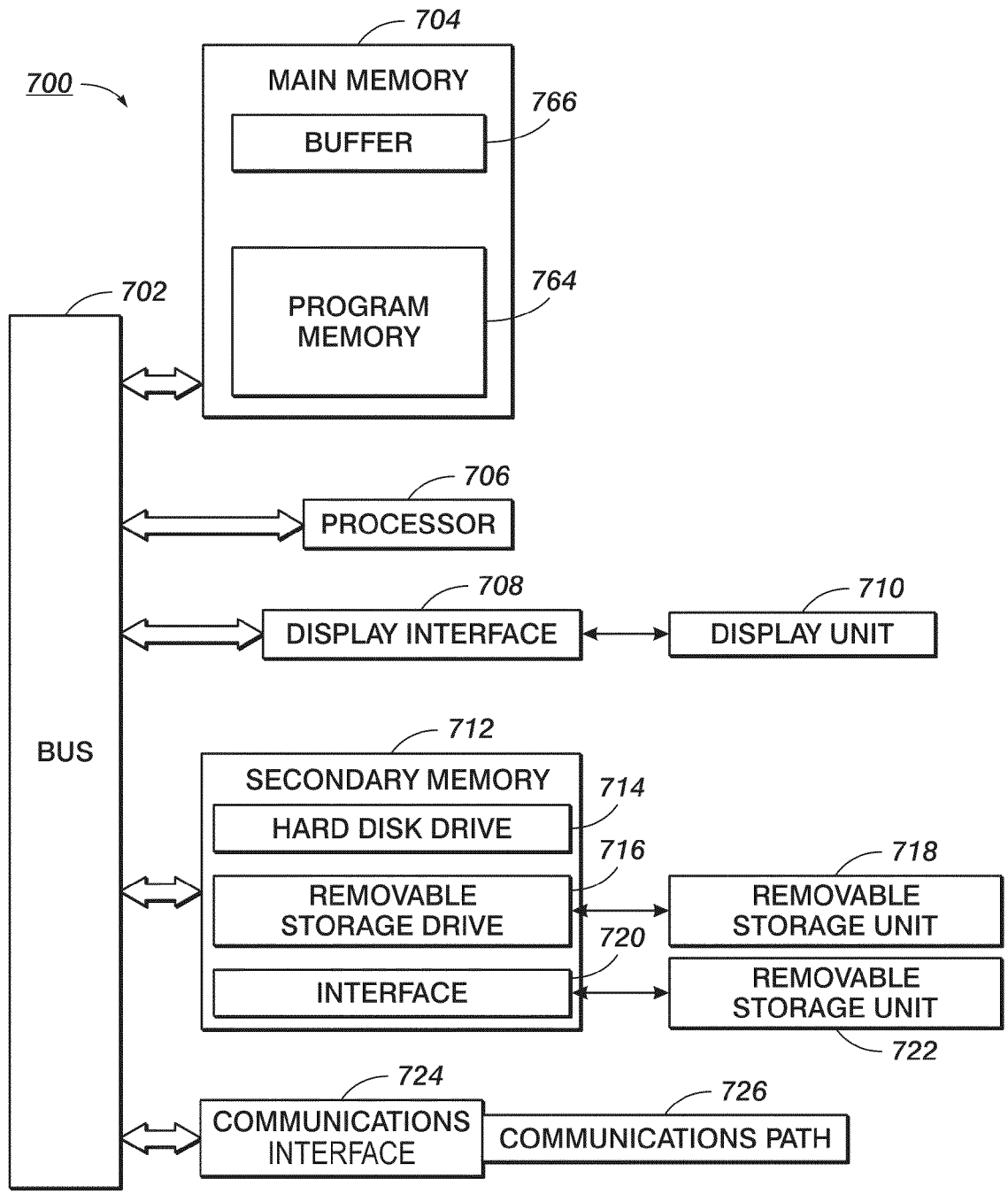
FIG. 7 illustrates a block diagram of one embodiment of a special purpose computer system useful for implementing one or more aspects of the present method for encoding and decoding data in a color barcode pattern.

Reference is now being made to FIG. 7 which illustrates a block diagram of one embodiment of a special purpose computer system useful for implementing one or more aspects of the present method for encoding and decoding data in a color barcode pattern. Such a system could be implemented as a separate computer system, an electronic circuit, or in an ASIC, for example. The nature of the implementation will depend on the image processing environment wherein the present image method finds its intended uses.

Special purpose computer system 700 includes processor 706 for executing machine readable instructions for performing various aspects of the present encoding/decoding method. The processor is in communication with bus 702. Main memory 704 is useful for storing machine readable instructions. Main memory may comprise random access memory (RAM) to support reprogramming and flexible data storage. Buffer 766 stores data addressable by the processor. Program memory 764 stores program instructions. Display interface 708 forwards data from bus 702 to display 710. Secondary memory 712 includes a hard disk 714 and storage device 716 for reading/writing to removable storage 718, such as a floppy disk, magnetic tape, optical disk, etc. Secondary memory may further include storage unit 722 adapted to exchange data through interface 720 which enables the transfer of software and data to the processor. Communications interface 724 allows data to be transferred to external devices. Example communication interfaces include a modem, network card, PCMCIA slot and card, etc. Software and data transferred using the communications interface are in the form of signals which may be electronic, electromagnetic, optical, or other signal forms. These signals are provided to the communications interface using channel 726 which carries such signals. The channel may comprise wire, cable, fiber optic, phone line, cellular link, RF, memory, or other means generally known in the arts.

Such a special purpose computer system would find one of its implementations in a document reproduction system having a scanning device capable of scanning a color barcode to obtain pixel color values therefrom. Special purpose hardware integrated therewith or software loaded thereon would perform any of the calculations described above and may further be used to determine orientation directions of the colored dots wherein a single data value of the original message is embedded. Such a system would be capable of providing the color barcode pattern containing the embedded data to an image output device. The document reproduction system would also be capable of receiving a color barcode pattern containing a data message embedded therein through a scanning device (or from a storage device or over a network). The scanning device incorporated with such a document reproduction system would have sufficient resolution to scan the image to determine the orientation of the dots of each of the cells wherein a single data value has been encoded. The system would determined the unique state of each of the encoded single data values based upon the dot orientations determined per colorant and thereafter retrieve the data message embedded in the color barcode pattern. For mobile applications, the color barcode may be captured using a mobile cellular device having an color digital camera.

Figure 8:
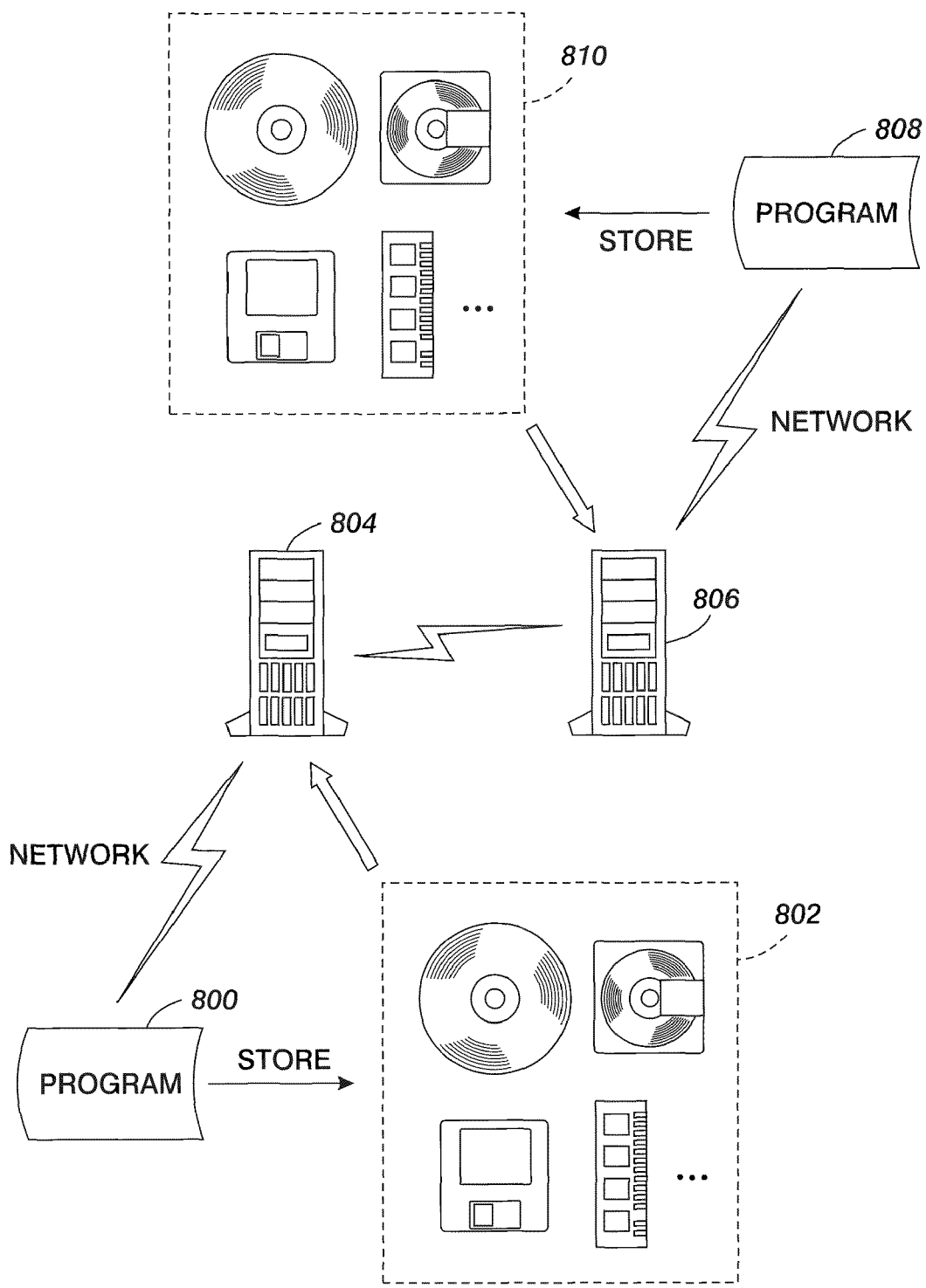
FIG. 8 is an explanatory diagram illustrating one example computer readable medium capable of storing machine readable instructions which, when mounted on a computer or a special purpose computer system, causes the system to perform one or more aspects of the present method.

Reference is now made to FIG. 8 which is an explanatory diagram illustrating one example computer readable medium capable of storing machine readable instructions which, when mounted on a computer or a special purpose computer system, causes the system to perform one or more aspects of the present encoding and decoding method. The machine readable instructions may be modified by one computer system and transferred to another computer system. One or more computer program instructions 800 for carrying out the present encoding/decoding method are loaded on computer-readable storage media 802 which includes media such as optical disks (CD-ROM etc.), magnetic disks, magnetic cards, memories (including IC cards and memory card). The storage media stores the machine readable program instructions for sale, transport, and storage by changing magnetic, optical, and/or electric energy states in response to program description instructions having been transferred to the media. The storage medium can then be mounted on computer system 804 and transferred to computer system 806. The program instructions can then be off-loaded to another program 808, in original form or modified, including data, and stored on storage media 810. The computer systems of FIG. 8 include processors capable of executing machine readable program instructions for performing one or more aspects of the present method described above with respect to the flow diagrams.

Terms such as, computer program medium, computer readable medium, computer executable medium, and computer usable medium are used herein to generally refer to a machine readable media. Computer program products are means for providing machine readable instructions to a computer system. Computer readable media store data, instructions, messages packets, or other instructions. Computer readable medium includes non-volatile memory, such as a floppy disk, hard drive, memory, ROM, RAM, flash memory, disk memory, and other permanent storage useful, for example, for transporting information such as data and machine readable program instructions. It may further include a CD-ROM, DVD, tape, cassette, or other digital or analog media, capable of having embodied thereon one or more logical programming instructions or other machine executable codes or commands that implement and facilitate the function, capability, and methods disclosed herein. The computer readable medium may additionally comprise information in a transitory state medium such as a network link or a network interface which may include a wired network or a wireless network which allows a computer to read such computer readable information.

It should be understood that the flow diagrams of the present method are illustrative. Other operations, for example, may be added, modified, enhanced, condensed, integrated, or consolidated. Variations thereof are intended to fall within the scope of the appended claims.

One or more aspects of the present method are intended to be incorporated in an article of manufacture, including one or more computer program products. The article of manufacture may be included on at least one storage device readable by a machine architecture, xerographic or other image processing system capable of executing program instructions. The article of manufacture may be included as part of a color management system, an operating system, a software program, a plug-in, or the like. Such an article of manufacture may further be shipped, sold, leased, or otherwise provided separately either alone or as part of an add-on, update, upgrade, or product suite by the assignee or a licensee hereof.

It will be appreciated that the above-disclosed features and functions and variations thereof may be desirably combined into many other different systems or applications. Various presently unforeseen or un-anticipated alternatives, modifications, variations, or improvements may become apparent and/or subsequently made by those skilled in the art which are also intended to be encompassed by the appended claims. The embodiments set forth above are considered to be illustrative and not limiting. Various changes to the above-described embodiments may be made without departing from the spirit and scope of the invention.

What is claimed is:

1. A method for decoding data embedded in a color barcode, the method comprising:

capturing an image of a hardcopy color barcode using an image capture device having a plurality of spectrally sensitive color channels, said color barcode containing a data message embedded therein, said message comprising a plurality of single data values, each single data value having only one unique state from a set of possible state values; and for each colorant in said hardcopy color barcode:
  producing a 2-dimensional image of a pattern representative of said colorant from image data received from said spectrally sensitive color channels;
  synchronizing said image with respect to a same horizontal and vertical axis as was used to print said colorant in said barcode;
  partitioning said image into tiles which substantially conforms to a same tiling used to encode said colorant in said barcode;
  associating each orientation direction that a dot of said colorant can have with an unique state of a single data value, said associations being the same used to encode data in said colorant of said barcode; and
  for each tile in said tiling containing a dot of said colorant:
    determining an orientation direction for said dot; and
    decoding said single data value embedded in said tile based on the unique state associated with said determined orientation direction.

2. The method of claim 1, wherein synchronizing said image comprises:
- obtaining a frequency domain representation of said image data;
- locating positions of magnitude peaks in said image data;
- estimating a global rotation and scaling factor from said magnitude peak positions; and
- synchronizing said image based on said estimated global rotation and scaling factors.

3. The method of claim 1, wherein determining said orientation direction for said dot comprises:
- calculating a plurality of image moments for said dot, one image moment being calculated along each of said unique orientation directions;
- determining a largest of said image moments, said largest moment determining an orientation direction for said colored dot.

4. The method of claim 3, further comprising computing a plurality of data values over a corresponding plurality of tiles in an error correction decoder to estimate said data message embedded in said hardcopy barcode.

5. The method of claim 1, further comprising:
- estimating a center of a current tile based on a center of mass calculated for said dot in said current tile; and
- using center of mass coordinates for said tile and center of mass coordinates of spatially adjacent tiles surrounding said current tile to estimate a region in image coordinates corresponding to a next tile to be processed.

6. The method of claim 1, wherein said image capture device comprises a camera.

7. A system for decoding data embedded in a color barcode, the system comprising:
- a memory and a storage medium; and
- a processor in communication with said memory and said storage medium, said processor executing machine readable instructions for performing:
  - capturing an image of a hardcopy color barcode using an image capture device having a plurality of spectrally sensitive color channels, said color barcode containing a data message embedded therein, said message comprising a plurality of single data values, each single data value having only one unique state from a set of possible state values; and
  - for each colorant in said hardcopy color barcode:
    - producing a 2-dimensional image of a pattern representative of said colorant from image data received from said spectrally sensitive color channels;
    - synchronizing said image with respect to a same horizontal and vertical axis as was used to print said colorant in said barcode;
    - partitioning said image into tiles which substantially conforms to a same tiling used to encode said colorant in said barcode;
    - associating each orientation direction that a dot of said colorant can have with an unique state of a single data value, said associations being the same used to encode data in said colorant of said barcode; and
    - for each tile in said tiling containing a dot of said colorant:
      - determining an orientation direction for said dot; and
      - decoding said single data value embedded in said tile based on the unique state associated with said determined orientation direction.

8. The system of claim 7, wherein synchronizing said image comprises:
- obtaining a frequency domain representation of said image data;
- locating positions of magnitude peaks in said image data;
- estimating a global rotation and scaling factor from said magnitude peak positions; and
- synchronizing said image based on said estimated global rotation and scaling factors.

9. The system of claim 7, wherein determining said orientation direction for said dot comprises:
- calculating a plurality of image moments for said dot, one image moment being calculated along each of said unique orientation directions;
- determining a largest of said image moments, said largest moment determining an orientation direction for said colored dot.

10. The system of claim 9, further comprising computing a plurality of data values over a corresponding plurality of tiles in an error correction decoder to estimate said data message embedded in said hardcopy barcode.

11. The system of claim 7, further comprising:
- estimating a center of a current tile based on a center of mass calculated for said dot in said current tile; and
- using center of mass coordinates for said tile and center of mass coordinates of spatially adjacent tiles surrounding said current tile to estimate a region in image coordinates corresponding to a next tile to be processed.

12. The system of claim 7, wherein said image capture device comprises a camera.

13. A method for decoding data embedded in a hardcopy color barcode, the method comprising:
- capturing an image of a color barcode using an image capture device having a plurality of spectrally sensitive color channels, said color barcode containing a data message embedded therein, said message comprising a plurality of single data values, each single data value having only one unique state from a set of possible state values;
- for each colorant in said hardcopy color barcode:
  - producing a 2-dimensional image of a pattern representative of said colorant from image data received from said spectrally sensitive color channels;
  - synchronizing said image with respect to a same horizontal and vertical axis as was used to print said colorant in said barcode;
  - partitioning said image into tiles which substantially conforms to a same tiling used to encode said colorant in said barcode;
  - associating each orientation direction that a dot of said colorant can have with an unique state of a single data value, said associations being the same used to encode data in said colorant of said barcode; and
  - for each tile in said tiling containing a dot of said colorant, calculating a plurality of image moments for said dot, one image moment being calculated along each of said unique orientation directions; and
- using a plurality of image moments computed over a corresponding plurality of tiles in an error correction decoder to estimate said data message embedded in said barcode.

14. The method of claim 13, wherein synchronizing said image comprises:
   obtaining a frequency domain representation of said image data;
   locating positions of magnitude peaks in said image data;
   estimating a global rotation and scaling factor from said magnitude peak positions; and
   synchronizing said image based on said estimated global rotation and scaling factors.

15. The method of claim 13, wherein determining said orientation direction for said dot further comprises determining a largest of said image moments, said largest moment determining an orientation direction for said colored dot.

16. The method of claim 15, further comprising computing a plurality of data values over a corresponding plurality of tiles in an error correction decoder to estimate said data message embedded in said hardcopy barcode.

17. The method of claim 13, further comprising:
   estimating a center of a current tile based on a center of mass calculated for said dot in said current tile; and
   using center of mass coordinates for said tile and center of mass coordinates of spatially adjacent tiles surrounding said current tile to estimate a region in image coordinates corresponding to a next tile to be processed.

18. The method of claim 13, wherein said image capture device comprises a camera.

* * * * *